(12) United States Patent
Cao et al.

(10) Patent No.: US 11,468,061 B2
(45) Date of Patent: Oct. 11, 2022

(54) INCREMENTAL SIMPLIFICATION AND OPTIMIZATION OF COMPLEX QUERIES USING DYNAMIC RESULT FEEDBACK

(71) Applicant: Teradata US, Inc., Dayton, OH (US)

(72) Inventors: Bin Cao, Redondo Beach, CA (US); Yi Xia, Rancho Palos Verdes, CA (US); Sanjib Mishra, Hyderabad (IN); Rama Krishna Korlapati, El Segundo, CA (US); Tri Minh Tran, Los Alamitos, CA (US); Mohammed Al-Kateb, Rolling Hills Estates, CA (US); Paul Laurence Sinclair, Manhattan Beach, CA (US); Chengyang Zhang, Bellevue, WA (US)

(73) Assignee: Teradata US, Inc., San Diego, CA (US)

( * ) Notice: Subject to any disclaimer, the term of this patent is extended or adjusted under 35 U.S.C. 154(b) by 204 days.

(21) Appl. No.: 16/217,255

(22) Filed: Dec. 12, 2018

(65) Prior Publication Data

US 2019/0114295 A1    Apr. 18, 2019

Related U.S. Application Data

(63) Continuation-in-part of application No. 14/041,790, filed on Sep. 30, 2013, now Pat. No. 10,268,724.

(60) Provisional application No. 62/598,588, filed on Dec. 14, 2017, provisional application No. 61/788,743, filed on Mar. 15, 2013.

(51) Int. Cl.
*G06F 16/2453* (2019.01)

(52) U.S. Cl.
CPC .. *G06F 16/24542* (2019.01); *G06F 16/24535* (2019.01); *G06F 16/24537* (2019.01); *G06F 16/24544* (2019.01)

(58) Field of Classification Search
CPC ......... G06F 16/24544; G06F 16/24542; G06F 16/24537; G06F 16/24535; G06F 16/2453; G06F 16/00; G06F 17/00; G06F 17/30; G06F 16/278; G06F 16/9024; G06F 16/2471; G06F 16/27; G06F 16/901; G06F 16/134; G06F 16/1734; G06F 16/1727; G06F 16/182; G06F 16/24534
USPC ................................ 707/713, 718, 719, 769
See application file for complete search history.

(56) References Cited

U.S. PATENT DOCUMENTS

| | | | |
|---|---|---|---|
| 5,600,831 A * | 2/1997 | Levy | G06F 16/24524 707/E17.093 |
| 6,356,887 B1 * | 3/2002 | Berenson | G06F 16/24524 707/999.002 |
| 2003/0212666 A1 * | 11/2003 | Basu | G06F 16/3338 707/999.003 |

(Continued)

*Primary Examiner* — Phong H Nguyen
(74) *Attorney, Agent, or Firm* — Randy L. Campbell, Jr.

(57) ABSTRACT

Techniques for improving complex database queries are provided. A determination is made whether to adopt a static or dynamic query execution plan for a received database query based on metrics. When a dynamic query execution plan is adopted, the database query is separated into query fragments. A plan fragment is generated for each query fragment and executed to generate feedback for the plan fragment. The feedback from the execution of each plan fragment is used to initiate query rewrite rules to simplify the corresponding query fragments. The rewritten query fragments are combined to generate the dynamic query plan.

13 Claims, 4 Drawing Sheets

(56) References Cited

U.S. PATENT DOCUMENTS

| | | | |
|---|---|---|---|
| 2005/0267866 A1* | 12/2005 | Markl | G06F 16/24542 707/999.002 |
| 2006/0047696 A1* | 3/2006 | Larson | G06F 16/24539 707/999.103 |
| 2009/0100004 A1* | 4/2009 | Andrei | G06F 16/2453 707/999.002 |
| 2009/0271385 A1* | 10/2009 | Krishnamoorthy | G06F 16/24532 707/999.005 |
| 2009/0327242 A1* | 12/2009 | Brown | G06F 16/24542 707/999.003 |
| 2010/0145929 A1* | 6/2010 | Burger | G06F 16/24542 707/E17.017 |
| 2012/0191698 A1* | 7/2012 | Albrecht | G06F 16/2453 707/718 |
| 2013/0006964 A1* | 1/2013 | Hammerschmidt | G06F 16/835 707/718 |
| 2013/0151504 A1* | 6/2013 | Konig | G06F 16/245 707/718 |

\* cited by examiner

INCREMENTAL SIMPLIFICATION AND OPTIMIZATION OF COMPLEX QUERIES USING DYNAMIC RESULT FEEDBACK

CROSS REFERENCE TO THE RELATED APPLICATIONS

This application claims priority under 35 U.S.C. §119(e) to the following co-pending and commonly-assigned patent application, which is incorporated herein by reference: U.S. Provisional Patent Application No. 62/598,588, entitled "INCREMENTAL SIMPLIFICATION AND OPTIMIZATION OF COMPLEX QUERIES USING DYNAMIC RESULT FEEDBACK," filed on Dec. 14, 2017, by Mohammed Al-Katab, Bin Cao, Sanjib Mishra, Yi Xia, Paul Laurence Sinclair, Tri Minh Tran, and Rama Krishna Korlapati.

This application is a continuation-in-part (CIP) of the following co-pending and commonly-assigned patent application, which is incorporated herein by reference: U.S. patent application Ser. No. 14/041,790, entitled "TECHNIQUES FOR IMPROVING THE PERFORMANCE OF COMPLEX QUERIES," filed on Sep. 30, 2013, by Rama Krishna Korlapati, Paul Sinclair, Grace Kwan-On Au, and Vijay Sarathy. U.S. patent application Ser. No. 14/041,790 claims priority under 35 U.S.C. §119(e) to U.S. Provisional Patent Application No. 61/788,743, entitled "TECHNIQUES FOR IMPROVING THE PERFORMANCE OF COMPLEX QUERIES," filed on Mar. 15, 2013, by Rama Krishna Korlapati, Paul Sinclair, Grace Kwan-On Au, and Vijay Sarathy.

BACKGROUND OF THE INVENTION

A query optimizer is a component of a database management system (DBMS) that analyzes Structured Query Language (SQL) queries to determine the most efficient way to execute a query.

Query optimization can be static or dynamic. Static optimization means that a query plan is generated upfront and then the query is executed using the generated plan. Dynamic optimization, also known as adaptive optimization, means that a query plan may be updated during the execution of query. An adaptive query optimizer may execute part of the query, and then feedback the result set to the optimizer engine for further and more informed optimizations. This dynamic feedback of the results in the middle of query execution enables numerous new optimization opportunities.

With the increasing heterogeneity of data sources and the complexity of big data analytic requirements, adaptive query processing has become indispensable. Unlike the traditional query optimizer which generates a static plan based only on estimation before execution, an adaptive query optimizer generates a more reliably optimal plan by utilizing real data information obtained from execution. The primary focus of commercial database management systems that are implementing one form or another of adaptive query processing is to collect statistics dynamically and change the query plan based on the updated statistics if, and when, needed.

Described below are novel query optimization techniques that leverage dynamic result feedback, using the result feedback to trigger query rewrite rules that can simplify a query in the middle of query execution. Simplification of a query can result in some fragments of the query being combined, rewritten, or even removed. The novel query optimization techniques discussed herein include several rewrite rules such as block simplification, block elimination, predicate push up/down, etc., but the value of the invention described herein is not limited to the rules outlined, as it also provides a general framework that can be used for other rules as well. The devised optimizations can be seamlessly implemented in the optimizer engine of current commercial and open source database systems.

To better explain the problem solved in this invention, the following query plan examples are provided:

EXAMPLE 1

Dynamic Plans Based on Different Result Feedback Values

SELECT t1.a1, t2.a2
FROM t1, t2
WHERE t1.a1=1 AND t2.c2=t1.c1 AND
   (t1.b1=10 or
   t2.b2 IN (SELECT t3.b3 FROM t3 WHERE t3.c3
     =t1.c1));

Assume t1.a1 is unique primary index. T1 is a single-row relation and qualified for providing dynamic result feedback. The following two cases show two different plans based on different values of t1.b1 after simplification.

Case 1: Assume result feedback of t1 (a1, b1, c1) is (1, 1, 1). After applying feedback, the value is plugged into the query:

SELECT 1, t2.a2
FROM t2
WHERE 1=1 AND t2.c2=1 AND
   (1=10 OR
   t2.b2 IN (SELECT t3.b3 FROM t3 WHERE
     t3.c3=1));

Then during simplification, because "1=10" is FALSE, the OR condition can be removed leaving only the right operand, and the query is simplified to:

SELECT 1, t2.a2
FROM t2
WHERE t2.c2=1 AND
   t2.b2 IN (SELECT t3.b3 FROM t3 WHERE
     t3.c3=1);

Case 2: Assume result feedback of t1 (a1, b1, c1) is (1, 10, 1). After applying feedback, the query looks like:

SELECT 1, t2.a2
FROM t2
WHERE 1=1 AND t2.c2=1 AND
   (10=10 OR
   t2.b2 IN (SELECT t3.b3 FROM t3 WHERE
     t3.c3=1));

Then during simplification, because "10=10" is TRUE, the whole OR condition can be removed, and the query is simplified to:

SELECT 1, t2.a2
FROM t2
WHERE t2.c2=1;

Note that in both cases the join of t1 and t2 is removed and the condition "1=1" is removed.

EXAMPLE 2

Simplification Using UNSAT

```
SELECT t2.a2
FROM t2
WHERE t2.b2 IN (SELECT t3.b3
    FROM t1, t3
    WHERE t3.c3=t1.c1 AND
      t1.a1=1 AND
      t1.b1>(SELECT MAX(t5.b5) FROM t5)) AND
    t2.c2 >ANY (SELECT t4.c4 FROM t4);
```
Assume t1.a1 is unique primary index. Both t1 (single-row relation) and (SELECT MAX(t5.b5) FROM t5) (noncorrelated scalar subquery—NCSSQ) are qualified for providing dynamic result feedback.

Assume result feedback of t1 (a1, b1, c1) is (1, 1, 1) and result feedback of the NCSSQ is 5. After applying feedback, the values are plugged into the query:
```
SELECT t2.a2
FROM t2
WHERE t2.b2 IN (SELECT t3.b3
    FROM t3
    WHERE t3.c3=1 AND
      1=1 AND
      1>5) AND
    t2.c2>ANY (SELECT t4.c4 FROM t4);
```
Then during simplification, the conditions in the IN subquery is simplified to FALSE:
```
SELECT t2.a2
FROM t2
WHERE t2.b2 IN (SELECT t3.b3
    FROM t3
      WHERE 1=0) AND
    t2.c2>ANY (SELECT t4.c4 FROM t4);
```
Because the connecting term is IN, FALSE can be pushed up to its parent and the IN subquery can be removed.
```
SELECT t2.a2
FROM t2
WHERE 1=0 AND
    t2.c2>ANY (SELECT t4.c4 FROM t4);
```
Next, the conditions conjunct with FALSE can be wiped out leading the ANY subquery to be removed. The final query after simplification is:
```
SELECT t2.a2
FROM t2
WHERE 1=0;
```

EXAMPLE 3

Simplification on UNION ALL Query

```
SELECT *
FROM (SELECT a1, b1, a2, b2
    FROM t1 JOIN t2 ON a1 IN (SELECT a3 FROM t3)
    UNION ALL
    SELECT a1, b1, a2, b2
    FROM t2 JOIN t1 ON a1=20 OR a1=30) dt;
```
This query needs to produce rows from the two UNION ALL branches, and then combine the results of both branches. Note that each branch has to join t1 and t2. A static plan for this query would be like:

Plan 1 (static plan):
1. Retrieve from t3 and duplicate to all AMPs.
2. Join t1 with the result of step 1.
3. Join t2 to the result of step 2. Write the result to common spool.
4. Retrieve from t1 with disjunctive conditions on a1, and duplicate to all AMPs.
5. Join t2 and the result of step 4. Write the result to common spool.

With adaptive query processing, however, a dynamic plan of the same query would look like:

Plan 2 (dynamic plan):
1. Execute subquery to retrieve from t3 in first branch.
2. Do subquery result feedback to first branch.
3. Retrieve from t1 with a condition on a1 based on the result feedback.
4. Join t2 to the result of step 3. Write the result to common spool.
5. Retrieve from t1 with disjunctive conditions on a1.
6. Join t2 and the result of step 5. Write the result to common spool.

With results feedback in place, assume the result of subquery returns two values: "20" and "30". This makes the first branch as follows:
```
SELECT a1, b1, a2, b2
FROM t1 JOIN t2 ON a1 IN (20, 30)
```
Note that the first branch now becomes semantically identical to the second branch, and since both branches are identical, there is no need to execute both branches. All that needs to be done is to execute only one branch and then write the result into a spool twice as follows:

Plan 3 (dynamic plan with query rewrite using dynamic result back):
1. Execute subquery to retrieve from t3 in first branch.
2. Do subquery result feedback to first branch.
3. Retrieve from t1 with a condition on a1 based on the result feedback.
4. Join t2 to the result of step 3. Write the result to common spool twice.

As can be seen above, the new optimized plan eliminates two steps from plan 2—the retrieve from t1 (step 5) and the join with t2 (step 6)—that were executed to produce the result of the second branch. This optimized version of the query can provide considerable performance improvements if the eliminated steps (e.g., the join step) are expensive. Such an improvement can have even more impact with more complex queries.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Database System Architecture

Figure 1:
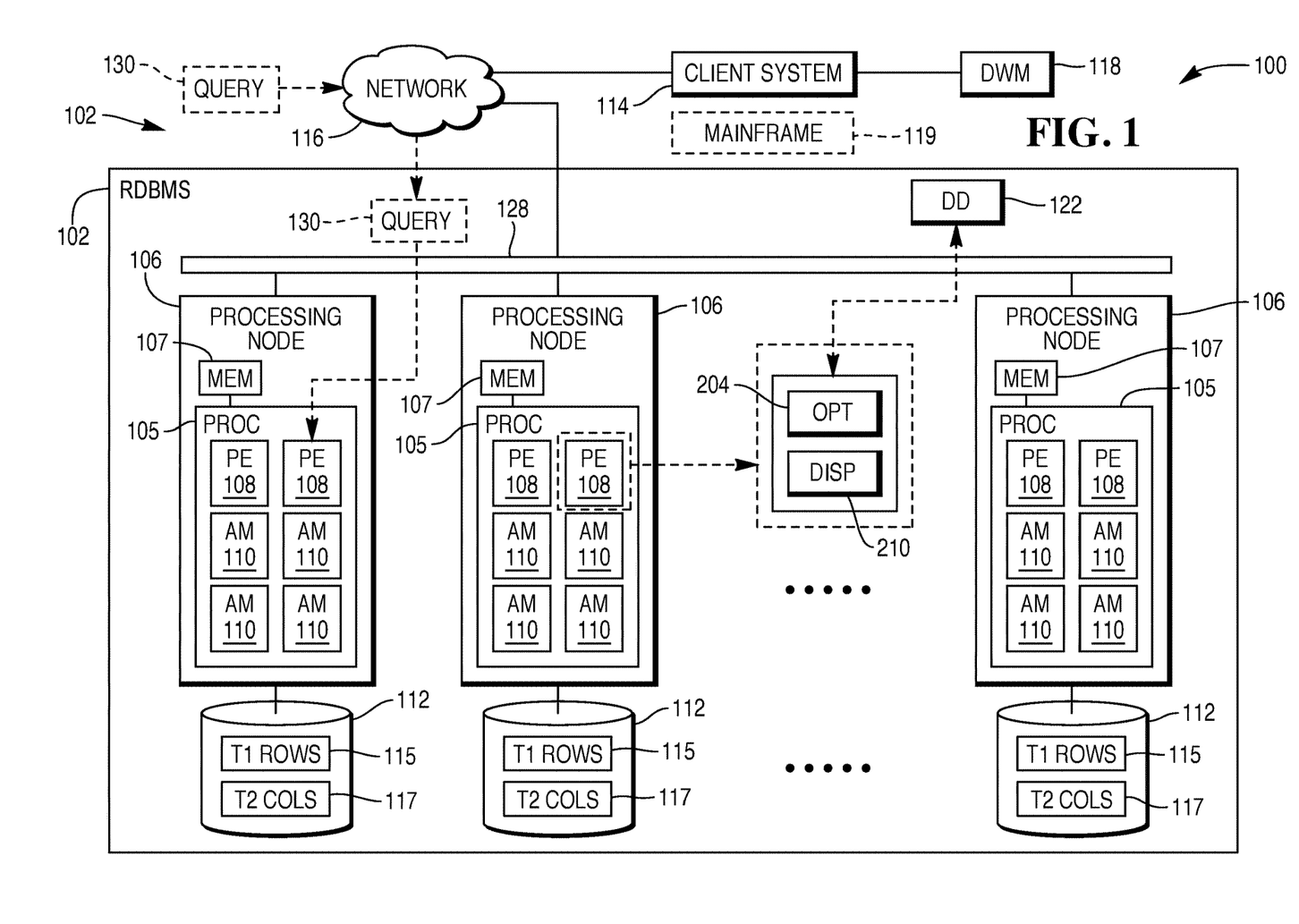
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more 5 configured to distribute rows across access modules 110 and their associated DSFs 112 in accordance with their primary index. The primary index distributes the records in a table across the AMPs, by hashing the columns that make up the primary index to determine which records go to which AMP.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 204 to assess the best plan for execution of the query. An example of an optimizer module 204 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 200 (see FIG. 2), and/or optimizer module 204 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Query Optimization

Figure 2:
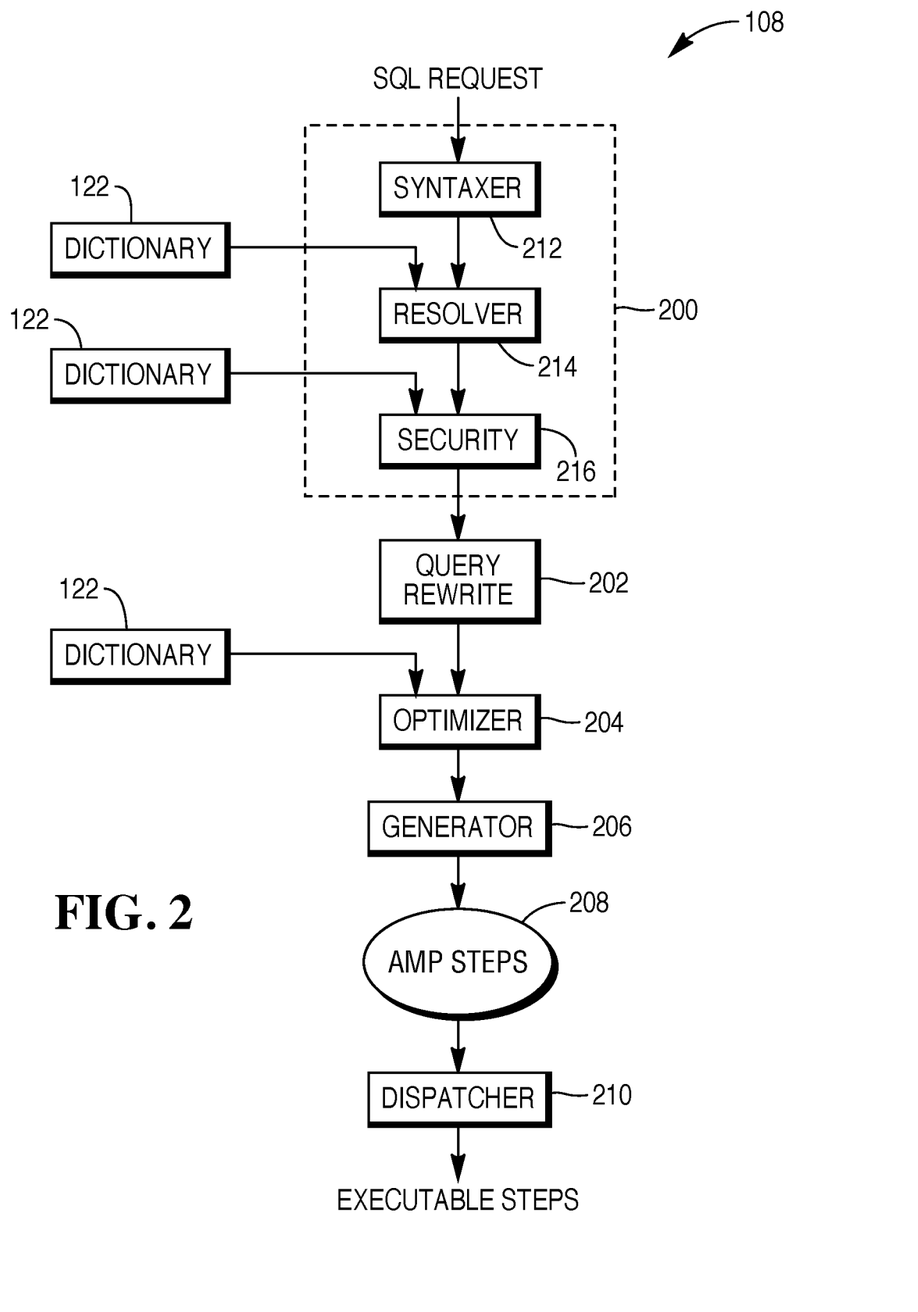
FIG. 2 is a block diagram of a parsing engine 108 employed within the example database system of FIG. 1.

FIG. 2 is a block diagram of a parsing engine 108 employed within the example database system of FIG. 1. In the example, each parsing engine module 108 includes the following primary components: a parser 200, a query rewriter 202, optimizer 204, a steps generator 206, and a dispatcher 210 as shown in FIG. 2. Parser module 200 includes a syntax checker (syntaxer) 212, a resolver 214, and a security module 216.

The parsing engine components illustrated in FIG. 2 perform the following functions for each SQL request sent to the database system from a client system application:

Syntaxer 212 analyzes the high-level syntax of the SQL request statement for errors. If the syntax passes the check, then the SQL request components are converted into a data structure called a parse tree, referred to as a SynTree, which the syntaxer then passes on to resolver 214. The SynTree is also referred to as the Black Tree for the query.

Resolver 214 receives the SynTree and fleshes it out with information about any required data conversions and discretionary access control security checks, adds column names and notes any underlying relationships with other database objects, and then passes the more fleshed-out tree, now known as a ResTree, to query rewrite 202. The ResTree is also referred to as the Red Tree for the query.

Query rewrite 202 receives the ResTree from parser 200 and rewrites the SQL text to prepare it for optimization. Rewriting may include:
  Converting outer joins to inner joins;
  Type 1 and Type 2 View folding;
  Pushing projections into views;
  Pushing conditions into views;
  Satisfiability and transitive closure; and
  Join elimination The query rewrite module then passes the revised, semantically equivalent, ResTree' to optimizer 204.

The optimizer analyzes the ResTree using various statistical and configuration data about the database and the system hardware components to determine optimum plans to access and join the tables specified by the request. This optimization may include further query rewrites.

The optimizer first checks the statistics cache to see if the statistics it needs have already been retrieved from data dictionary 122. If not, the optimizer retrieves them from the data dictionary. The optimizer then examines any locks placed by the SQL request and attempts to optimize their placement to enhance performance and avoid deadlocks.

An Optimized Parse Tree, transformed from a simple statement tree to a complete operation tree, is then passed to the step generator 206 for further processing. This optimized version of the parse tree is referred to as the White Tree, or Operation Tree, for the request.

Generator 206 creates AMP directives or steps 208, derived from the Optimized Parse Tree, and passes the AMP steps to dispatcher 210 for assignment to the AMPs.

The Dispatcher sequentially, incrementally, and atomically transmits the AMP Steps to the appropriate AMPs for processing.

The SQL query optimizer 204 determines the most efficient way to access, join, and aggregate the tables required to answer an SQL request. In the Teradata database system illustrated in FIG. 1, the majority of query rewrite techniques are done in the query rewrite module (QRW) 202 and a small amount of techniques are done in optimizer 204. The output of QRW 202, the red tree, is translated within the optimizer into the whitened data structure for planning During this process, with more information known about the query's semantic meaning, some query rewrite techniques, especially subquery related techniques, can be invoked and applied.

Traditionally, query optimizers depend on information available at optimization time such as statistics, cost parameters, predicate values, and resource availability in order to perform query transformations and optimization. The final plan for a request, referred to as a static plan, is chosen by computing the cost of each possible plan variation and selecting the least costly plan. During this process, the optimizer assumes that all the information is accurate and generates the plan for the entire request, which may consist of multiple statements/queries. However, this assumption may not be true all the time, particularly for complex queries.

U.S. patent application Ser. No. 14/041,790, entitled "TECHNIQUES FOR IMPROVING THE PERFORMANCE OF COMPLEX QUERIES," referenced above, describes an adaptive query optimization technique, referred to as incremental planning and execution (IPE), to improve the performance of the complex queries. When a request is received by IPE, the request is fragmented into smaller pieces referred to as request fragments. The request fragments are planned and executed incrementally, and statistical summary information and/or actual results from the execution of the intermediate request fragments are provided as feedback to the planning of remainder of the plan. The plan generated by IPE is referred to as a dynamic plan.

Improved Adaptive Query Processing

An improved IPE optimization process is illustrated in the flow diagram of FIGS. 3A and 3B and described below. This improved process employs an additional module, referred to an OptRewrite module, to further simplify and optimize queries on the fly.

The OptRewrite module is composed of a driver, a light-weight, rule-based query rewrite engine, and a set of rewrite rules. The rewrite rules include existing rules in optimizer 204, such as SSQ Elimination, and new rules for exploiting result feedback, e.g., Block Simplification and Predicate Pushup. The OptRewrite module also provides a general framework for introducing other rewrite rules in the future.

With the OptRewrite module invoked after applying result feedback, a query can be significantly simplified and optimized for superior performance. Although presented herein as an improvement to the IPE process., the idea of query simplification and optimization on-the-fly using dynamic result feedback can be generalized to any database management system (DBMS) which employs adaptive query processing.

As discussed above, the traditional method of processing an SQL query usually goes through two independent phases: the query optimizer first enumerates alternative plans and picks the optimal plan with the least cost, and then the plan executor carries out that plan and returns the result. Note that the least cost is only an estimate based on existing statistics and cost models. Without taking into consideration actual runtime information, the cost is likely to be either over or underestimated and may result in a suboptimal plan and inferior performance. To overcome these problems, adaptive query processing utilizes runtime information to guide through planning and/or execution.

The most direct and popular way of performing adaptive query processing is capturing dynamic statistics, such as the join cardinality, during execution, then either injecting the dynamic statistics back into planning to help choose a more reliably optimal plan or comparing the dynamic statistics to the plan estimate during execution and making a decision if a plan modification or re-optimization is required.

The improved process described herein uses dynamic results obtained from executing a part of a query in performing adaptive query processing. By feeding back the actual values into the query the accuracy of an estimation can improved, and by performing a series of query write techniques, the query can be significantly simplified to achieve superior performance.

Figure 3A:
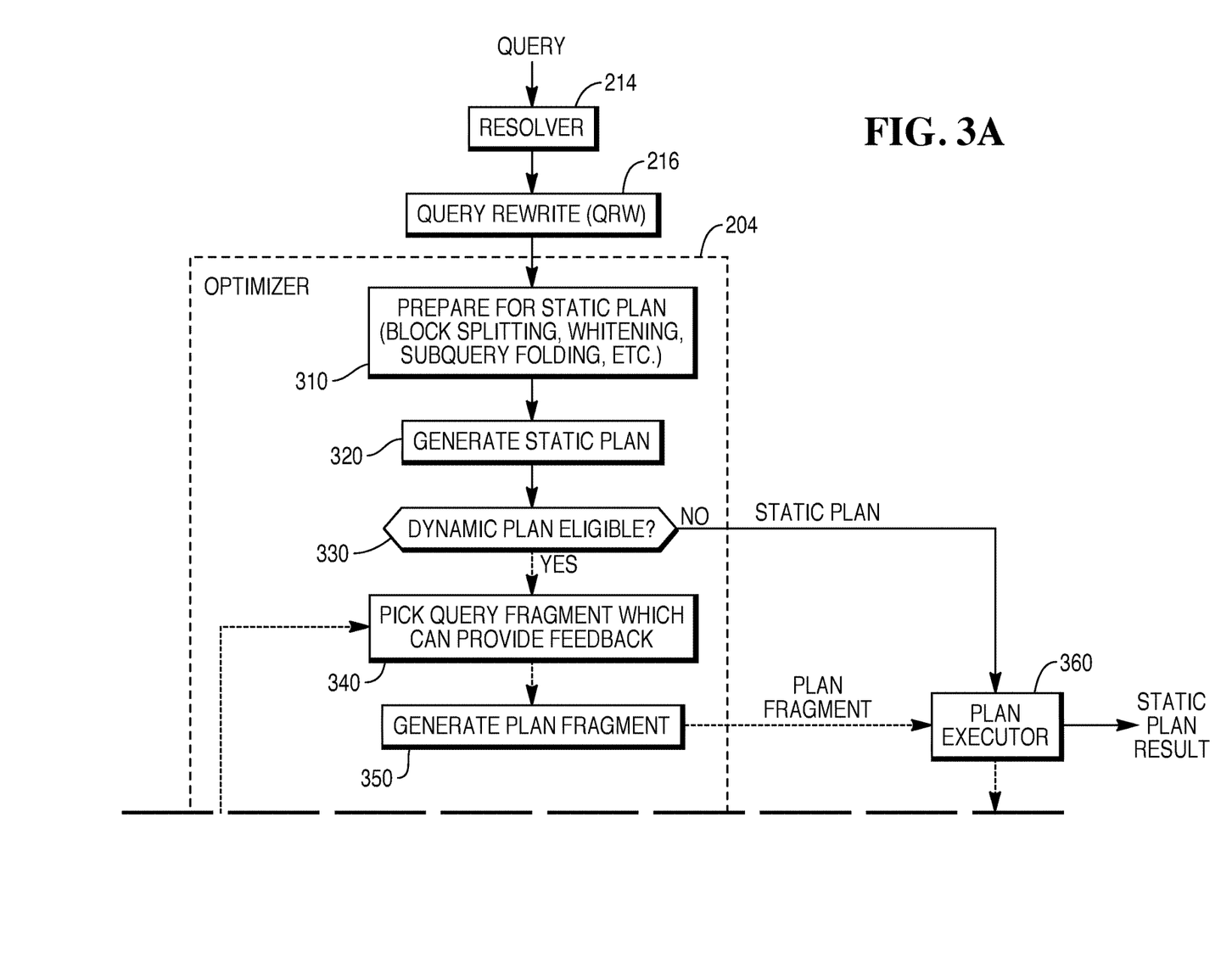
FIGS. 3A and 3B provide a diagrammatic representation of query optimizer 204 implemented in accordance with an embodiment of the invention.
Figure 3B:
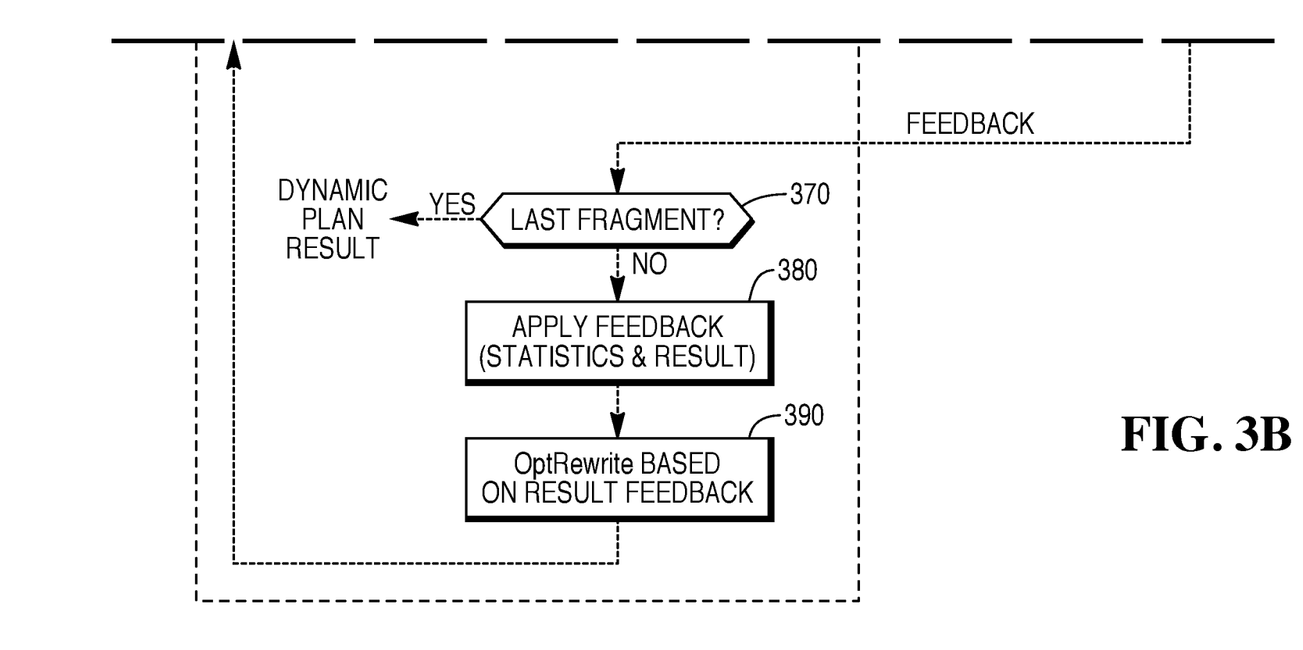

This improved process is implemented using a rule-based query rewrite engine, referred to as an OptRewrite module, invoked during dynamic planning The OptRewrite module is illustrated in the block diagram shown in FIGS. 3 as a part of Teradata Corporation's Incremental Planning and Execution (IPE) infrastructure.

Referring to FIGS. 3A and 3B, the operation of the improved IPE process including the rule-based query rewrite engine, OptRewrite module 390, will now be explained.

First, Resolver 214 parses an input query for syntax check.

Then, Query Rewrite subsystem (QRW) 216 takes as input the parsed query and performs rule-based rewrites, including view folding, predicate simplification, join elimination, etc. The purpose of this rewrite is to flatten the query in order to make query components, such as views, derived tables, correlated subqueries, and aggregates, more tractable for optimization.

Next, Optimizer 204 takes over the rewritten query and performs the following major steps to generate a static plan using traditional estimation. If the query is qualified for IPE, a dynamic plan will be generated using dynamic statistics or result feedback.

1. Prepare for static plan (310):
    a) Block splitting, where query blocks are created based on the rewritten query structure. A parent-child relationship exists between two blocks if one resides within another.
    b) Whitening, where the query is represented using internal expressions carrying more analytical information according to the semantics of the query.
    c) Subquery folding, where a rule-based decision is made if a subquery can be processed together with its parent block, the so-called "global optimization". If yes, the subquery is released to its parent block by combining its contents to its parent's and its own block is removed; otherwise the subquery stays non-released in its own block. Note that after subquery folding, the number of query blocks may get reduced; and the nesting level assigned to tables and conditions is used to logically represent their original blocks.
2. Generate static plan using traditional query processing techniques (320).
3. If dynamic plan is not eligible, send the static plan to plan executor 360 for execution (330).
4. Otherwise, generate dynamic plan:
    a) Identify one or more sub-expressions of the query which can provide statistics feedback and/or result feedback based on the pre-defined criteria and create a request fragment (340).
    b) Create a plan fragment by generating a plan for each block in the request fragment (350).
    c) If it is the last fragment, stop here and go to step 5, "Execute the last plan fragment".
    d) Otherwise, execute the plan fragment to get dynamic feedback (370).
    e) Apply feedback (380). For statistics feedback, statistics values are utilized to derived stats. For result feedback, actual values are applied to all blocks in which they appear.
    f) Invoke the OptRewrite module to perform rule-based query rewrites in order to incrementally simplify the query (390).
    g) Repeat the process from step 4(a).
5. Execute the last plan fragment.

Note that only those query blocks with feedback applied and their related blocks will be re-planned, and the static plan will be reused for those blocks which are unaffected. Thus, a dynamic plan is a truly incremental plan.

The criteria for choosing a candidate for providing dynamic result feedback (FIG. 3A, step 330) is that it is an independent part of the query, and the result is small enough for the values to be plugged in.

Example candidates include, but are not limited to:

Noncorrelated scalar subqueries, which return a single row with a single field.

Single-row relations, where a field is defined as unique. Selection on this field guarantees the result to be one row with one or more fields.

Noncorrelated subqueries with small enough results which can be processed like IN-list.

Derived tables, if the dynamic statistics feedback show zero or one row, it can be switched to result feedback.

Use of Dynamic Result Feedback in OptRewrite

Although only several limited types of queries can provide dynamic result feedback, the values plugged in to a query bring great opportunities for query simplification and optimization.

First of all, without doing any simplification, the actual values plugged in to the conditions can improve the accuracy of estimation and lead to a more reliably optimal plan. For instance, it is quite hard to estimate selectivity of a complex expression, e.g., the complex expression happens to be a noncorrelated scalar subquery, and the condition is "t1.b1=(SELECT MAX(t2.b2) FROM t2)". The subquery can be executed first to get the result feedback—assume it is 5. Then the condition becomes "t1.b1=5", and the selectivity can be easily estimated.

Secondly, the conditions with the actual values plugged in can significantly simplify and optimize the query by deriving new conditions using transitive closure, eliminating unnecessary conditions and joins, and triggering cross block (up and/or down) simplification, etc. One example is exploiting satisfiability (SAT) and unsatisfiability (UNSAT) in rewriting the query. A condition that involves the feedback may directly become TRUE (SAT) or FALSE (UNSAT). A TRUE condition can wipe out all other conditions together with it in the disjunctive form, and a FALSE condition can empty the whole conditions together with it in the conjunctive for—it can even make the block UNSAT, leading to block elimination. Moreover, UNSAT in a child block could be continuously propagated up to its parent block and even to its grandparent block until the whole branch becomes UNSAT; and UNSAT in a parent block could be propagated down to and empty its child blocks in another branch. This way the query can be greatly simplified.

Thirdly, the correlation of a subquery can be reduced or removed if the result feedback is on the correlated conditions. Processing correlated subqueries can be very expensive. Even today, the nested iteration approach, which computes subquery once for every single row from the outer query, is still widely used in most DBMS. The Teradata optimizer tackle this problem by using global optimization; but join or derived outer join operations cannot be avoided, and complexity arises when dealing with multiple correlated subqueries. Reducing or removing correlation can greatly simplify processing and improve query performance.

Finally, with dynamic result feedback, the branches of the query with a SET operation can be combined or eliminated and thus the SET operation is not needed anymore, resulting in a simpler and more optimized query. For example, dynamic result feedback for SET operation queries can produce common (i.e., identical) blocks in a query that were unknown to be identical without the feedback. Eliminating common branches improves overall query performance and, moreover, reduces parsing time and resource consumption (such as memory footprint and spool usage). Result feedback may also bring about branches that are similar, albeit not identical, to each other. While these branches are not identical, some of them can still be combined, resulting in a simpler and more optimized query.

OptRewrite:

Incrementally Simplify and Optimize Queries with Result Feedback Applied

As discussed above, the OptRewrite module is invoked during dynamic planning after applying result feedback, to do simplification and optimization. The purpose of this process is to perform incremental query rewrites on a query block with feedback applied and related blocks, instead of re-invoking the query rewrite (QRW) module and/or optimizer to re-optimize an entire query. The OptRewrite operation is similar to QRW as they both do query rewrites. What distinguishes the OptRewrite operation from QRW are the following features:

1) QRW 216 is independent of, and prior to, optimizer 204; while OptRewrite 390 is inside and invoked by optimizer 204.
2) QRW 216 and OptRewrite 390 work on different data structures: QRW works on the red tree, i.e., a tree expression of the parsed SQL statement, and OptRewrite works on the whitened data structure, mainly TermList which carries more semantic information of the query.
3) More powerful query rewrite techniques, such as cross block simplification, are available in OptRewrite 390.

The OptRewrite module is driven by the OptRewrite driver, a light-weight, rule-based query rewrite engine. The OptRewrite driver defines a set of rules, each rule can trigger other rules if it is applied—the decision is made by exploiting interactions among the various rewrites. The OptRewrite driver is invoked every time after result feedback in a plan fragment is applied. The driver traverses query blocks and applies the enabled and/or trigged rules in a particular order, shown below, to the blocks with feedback applied and related blocks.

Algorithm: OptRewrite Driver

```
BEGIN
    Traverse blocks and populate BlockRuleTable in each block:
        Create BlockRuleTable for the block
        Initialize BlockRuleTable
        IF the block does not receive result feedback
            RETURN
        FOR each rule
            IF the rule is enabled and applicable to the block
                Enable the rule in the block's BlockRuleTable
        END
    Loop to apply rules:
        FOR iteration not hit the limit or
            Traverse blocks and apply rules for each block:
                FOR each rule
                    IF the rule is not enabled OR
                        the rule's traverse order != current traversal order
                        CONTINUE
                    Apply the rule to the block (concrete rule)
                    Apply triggers if the rule was applied successfully
                    Disable the applied rule
                END
                Scan BlockRuleTable and set traversal-order
        END
END
```

OptRewrite rules include, but are not limited to:

Block Simplification. Rewrite a query to a more simplified form by simplifying TermList, exploiting UNSAT, removing unreferenced correlations, etc. Applied using post-order block traversal. Once it is applied, it can trigger Predicate Pushup, Block Elimination, Predicate Pushdown, and Join Elimination.

Simplify TermList at the same nesting level, such as checking satisfiability and using transitive closure to infer new predicates, consolidating predicates, removing duplicate predicates.

Propagate UNSAT from child to parent if certain criteria is satisfied.

Apply UNSAT at parent to child to remove the unnecessary children if certain criteria is satisfied.

Remove unreferenced correlated tables if a correlated subquery becomes non-correlated after applying result feedback.

Join Elimination. Remove unnecessary tables that participates in a join, for instance, a PK-FK join. Applied using post-order block traversal. Once it is applied, it can trigger Block Simplification.

SSQ Elimination. After applying feedback, the original defined scalar subquery (SSQ) may not be used anywhere and can be safely removed. Applied using post-order block traversal. Once it is applied, it can trigger Block Simplification (in parent).

Predicate Pushup. Push predicates from child to parent to do cross block optimization. For instance, if FALSE is the only term, the block becomes an UNSAT block, and this UNSAT can be pushed up to its parent to make the predicates in its parent UNSAT if certain criteria is satisfied. Applied using post-order block traversal. Once it is applied, it can trigger Block Simplification (in parent), Predicate Pushup (in parent), Block Elimination, and SSQ elimination.

Block Elimination. Eliminate unnecessary UNSAT or non-active blocks. Applied using post-order block traversal. Once it is applied, it can trigger Block Elimination (in parent).

Predicate Pushdown. Push predicates into spooled views, spooled derived tables to help improve performance by reducing the cardinality of spools.

Applied using pre-order block traversal. Once it is applied, it can trigger Block Elimination and Predicate Pushdown.

Note that:

New rules can be easily added to the OptRewrite framework.

Due to the global optimization of subquery processing in Teradata, a particular data structure, called TermList Organizer which groups terms based on the nesting level, is used in OptRewrite. The main purpose is that simplification can only be done on terms with the same nesting level.

The example provided below, which follows up on Example 2 above, illustrates query plan simplification through use of the OptRewrite module.

EXAMPLE 4

Simplification Through OptRewrite

SELECT t2.a2
FROM t2
WHERE t2.b2 IN (SELECT t3.b3
    FROM t3
    WHERE t3.c3=1 AND
      1=1 AND
      1>5) AND
    t2.c2>ANY (SELECT t4.c4 FROM t4);

After applying feedback, OptRewriteDriver is invoked to do the simplification. During post-order block traversal, the subquery (with table t3) is visited first. Because it received the result feedback, rules are applied to this block. First the Block Simplification rule is applied, and the conditions are simplified to FALSE:

SELECT t2.a2
FROM t2
WHERE t2.b2 IN (SELECT t3.b3
    FROM t3
    WHERE 1=0) AND
    t2.c2>ANY (SELECT t4.c4 FROM t4);

Then the Predicate Pushup rule pushes FALSE to parent, and triggers rules enabled in the parent block, and the Block Elimination rule eliminates this subquery block.

SELECT t2.a2
FROM t2
WHERE 1=0 AND
    t2.c2>ANY (SELECT t4.c4 FROM t4);

Next, the subquery (with table t4) is visited. Since no feedback applied, no rules are applied.

Next, the main query is visited. Since the rules have been triggered, rules are applied to parent block although it originally does not receive result feedback. After the Block Simplification rule is applied, the conditions first becomes FALSE, and then later on it wiped out the ANY subquery with tables t4. Later on the Block Elimination rule removed the block of subquery with table t4. The final query after simplification is:

SELECT t2.a2
FROM t2
WHERE 1=0;

While this specification contains many specifics, these should not be construed as limitations on the scope of the disclosure or of what may be claimed, but rather as descriptions of features specific to particular implementations of the disclosure.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method implemented and programmed within a non-transitory computer-readable storage medium and processed by a processor, the processor configured to execute the method, comprising:
   determining, at the processor, to execute a received database query via a dynamic query plan, wherein said received database query comprises at least one action to be performed on at least a portion of a database stored on at least one storage device:
   fragmenting, at the processor, in response to the determination, the database query into query fragments, each query fragment comprising one or more query blocks;
   for each query fragment:
   generating, by said processor, a plan fragment for the query fragment:
   executing, by said processor, the plan fragment to generate feedback for the plan fragment; and
   performing, by said processor, an incremental query rewrite on the query fragment with feedback applied to said plan fragment to produce a rewritten query fragment;
   combining, by said processor, said rewritten query fragments to generate said dynamic query plan; and
   executing said database query in accordance with said dynamic query plan.

2. The method of claim 1, wherein determining, at the processor, to execute said received database query via a dynamic query plan comprises determining whether said database query includes at least one of the following:
   a noncorrelated scalar subquery which returns a single row with a single field:
   a single-row relation, where a field is defined as unique;
   a noncorrelated subquery with small enough results which can be processed as an IN-list; and a derived table.

3. The method of claim 1, wherein generating, by said processor, a plan fragment for the query block comprises generating a plan for each block in the request fragment.

4. The method of claim 1, wherein performing an incremental query rewrite on the query fragment with feedback applied to produce a rewritten query fragment comprises applying at least one rewrite rule from a set of rewrite rules, said at least one rewrite rule initiated in response to said feedback, to said database query fragment to produce said rewritten query fragment.

5. The method of claim 1, wherein performing an incremental query rewrite on the query fragment with feedback applied to produce a rewritten query fragment includes at least one of the following:
performing. block simplification on the query fragment;
performing join elimination on the query fragment to remove unnecessary tables that participate in a join;
performing scalar subquery (SSQ) elimination on the query fragment; performing predicate pushup on the query fragment;
performing block elimination on the query fragment to eliminate unnecessary or non-active blocks; and
performing predicate pushdown on the query fragment.

6. A method implemented and programmed within a non-transitory computer-readable storage medium and processed by a processor, the processor configured to execute the method, comprising:
evaluating, at the processor, a received database query to produce a dynamic query plan for execution of said database query, wherein said received database query comprises at least one action to be performed on at least a portion of a database stored on at least one storage device;
fragmenting, at the processor, the database query into query fragments, each query fragment comprising one or more query blocks;
for each query fragment:
generating, by said processor, a plan fragment for the query fragment;
executing, by said processor, the plan fragment to generate feedback for the plan fragment; and
performing an incremental query rewrite on the query fragment with feedback applied to said plan fragment to produce a rewritten query fragment;
combining, by said processor, said rewritten query fragments to generate said dynamic query plan; and
executing said database query in accordance with said dynamic query plan.

7. The method of claim 6, wherein generating, by said processor, a plan fragment for the query block comprises generating a plan for each block in the request fragment.

8. The method of claim 6, wherein performing an incremental query rewrite on the query fragment with feedback applied to produce a rewritten query fragment comprises applying at least one rewrite rule from a set of rewrite rules, said at least one rewrite rule initiated in response to said feedback, to said query fragment to produce said rewritten query fragment.

9. The method of claim 6, wherein performing an incremental query rewrite on the query fragment with feedback applied to produce a rewritten query fragment includes at least one of the following:

performing block simplification on the query fragment;
performing join elimination on the query fragment to remove unnecessary tables that participate in a join;
performing scalar subquery (SSQ) elimination on the query fragment;
performing predicate pushup on the query fragment:
performing block elimination on ate query fragment to eliminate unnecessary or non-active blocks; and
performing predicate pushdown on the query fragment.

10. A database system, comprising:
memory configured with a query optimizer that analyzes a database query to determine a query plan for executing said database query, wherein the database query includes at least one action to be performed on at least a portion of a database stored in a storage device, and wherein the query optimizer is configured to:
generate a static plan for said database query and make a determination as to whether to use the static plan with the query or to generate and use a dynamic plan for the query;
fragment the database query into query fragments when the dynamic query plan is selected, each query fragment comprising one or more query blocks;
for each query fragment:
generate a plan fragment for the query fragment;
execute the plan fragment to generate feedback for the plan fragment; and
perform an incremental query rewrite on the query fragment with feedback applied to said plan fragment to produce a rewritten query fragment; and combine said rewritten query fragments to generate said dynamic query.

11. The database system of claim 10, wherein generating a plan fragment for the query block comprises generating a plan for each block in the request fragment.

12. The database system of claim 10, wherein performing an incremental query rewrite on the query fragment with feedback applied to produce a rewritten query fragment comprises applying at least one rewrite rule from a set of rewrite rules, said at least one rewrite rule initiated in response to said feedback, to said query fragment to produce said rewritten query fragment.

13. The database system of claim 10, wherein performing an incremental query rewrite on the query fragment with feedback applied to produce a rewritten query fragment includes at least one of the following:
performing block simplification on the query fragment;
performing join elimination on the query fragment to remove unnecessary tables that participate in a join;
performing scalar subquery (SSQ) elimination on the query fragment;
performing predicate pushup on the query fragment;
performing block elimination on the query fragment to eliminate unnecessary or non-active blocks; and
performing predicate pushdown on the query fragment.

* * * * *